(12) United States Patent
Jost

(10) Patent No.: US 10,168,193 B2
(45) Date of Patent: Jan. 1, 2019

(54) SENSOR WITH SWITCHING MATRIX SWITCH

(71) Applicant: Infineon Technologies AG, Neubiberg (DE)

(72) Inventor: Franz Jost, Stuttgart (DE)

(73) Assignee: Infineon Technologies AG, Neubiberg (DE)

( * ) Notice: Subject to any disclaimer, the term of this patent is extended or adjusted under 35 U.S.C. 154(b) by 802 days.

(21) Appl. No.: 14/591,057

(22) Filed: Jan. 7, 2015

(65) Prior Publication Data

US 2016/0197484 A1 Jul. 7, 2016

(51) Int. Cl.
*G01D 21/00* (2006.01)
*G05B 19/08* (2006.01)

(52) U.S. Cl.
CPC ............ *G01D 21/00* (2013.01); *G05B 19/08* (2013.01)

(58) Field of Classification Search
CPC ............ H02J 4/00; G01D 21/00; G05B 19/08
USPC ......................................................... 307/116
See application file for complete search history.

(56) References Cited

U.S. PATENT DOCUMENTS

| | | | |
|---|---|---|---|
| 6,535,824 B1* | 3/2003 | Mansky | B01J 19/0046 374/49 |
| 7,813,221 B2 | 10/2010 | Barakat | |
| 2002/0130312 A1 | 9/2002 | Yu | |
| 2008/0151088 A1* | 6/2008 | Frey | G01N 27/3275 348/308 |
| 2013/0342194 A1 | 12/2013 | Motz et al. | |

FOREIGN PATENT DOCUMENTS

| | | |
|---|---|---|
| CN | 101201279 A | 6/2008 |
| CN | 101605372 A | 12/2009 |
| CN | 201508216 U | 6/2010 |

* cited by examiner

*Primary Examiner* — Alfonso Perez Borroto
(74) *Attorney, Agent, or Firm* — Eschweiler & Potashnik, LLC

(57) ABSTRACT

A sensor comprises a matrix switch that includes a number of switching elements configured in a matrix configuration. The sensor comprises one or more sensor elements configured in a sensor matrix configuration. A controller operates to dynamically select one or more signal routes via the switching elements to communicate data from one or more sensor elements of the sensor matrix. The matrix switch can operate to dynamically route multiple signal routes between sensor elements of the sensor to another component based on a set of criteria.

20 Claims, 5 Drawing Sheets

SENSOR WITH SWITCHING MATRIX SWITCH

FIELD

The present disclosure is in the field of communications, and more specifically, a sensor with a matrix switch for sensor communications.

BACKGROUND

Functional safety represents a clear differentiator for current and future products in automotive industries and in particular with sensor systems. To achieve corresponding targets in terms of automotive safety integrity level (ASIL), new and enhanced concepts have to be established. To achieve a dedicated ASIL level, different target parameters such as a failure in time (FIT) rate, diagnostic coverage, single point fault metric (SPFM), latent point failure metric (LPFM), or other system parameters have to achieve a dedicated value. For sensors, a typical safety goal is it to ensure dedicated signal accuracy in a predefined time (e.g., 5° deviation of the true angle value has to be detected in 5 ms at an angle sensor). The problem to be overcome in that context is simply how to prove a dedicated diagnostic coverage by specific safety mechanisms. The choice of safety mechanisms represents an important element and the more a dedicated mechanism is able to cover, the better and more fail-safe the system.

An important element represents the interface between sensor and the controller or other component, as this can only be covered partly by internal checks as well as partly by external checks. Therefore innovative concepts for the interface are needed to cover the link between sensor and system control units in an optimal, efficient and costly form.

DETAILED DESCRIPTION

Figure 1:
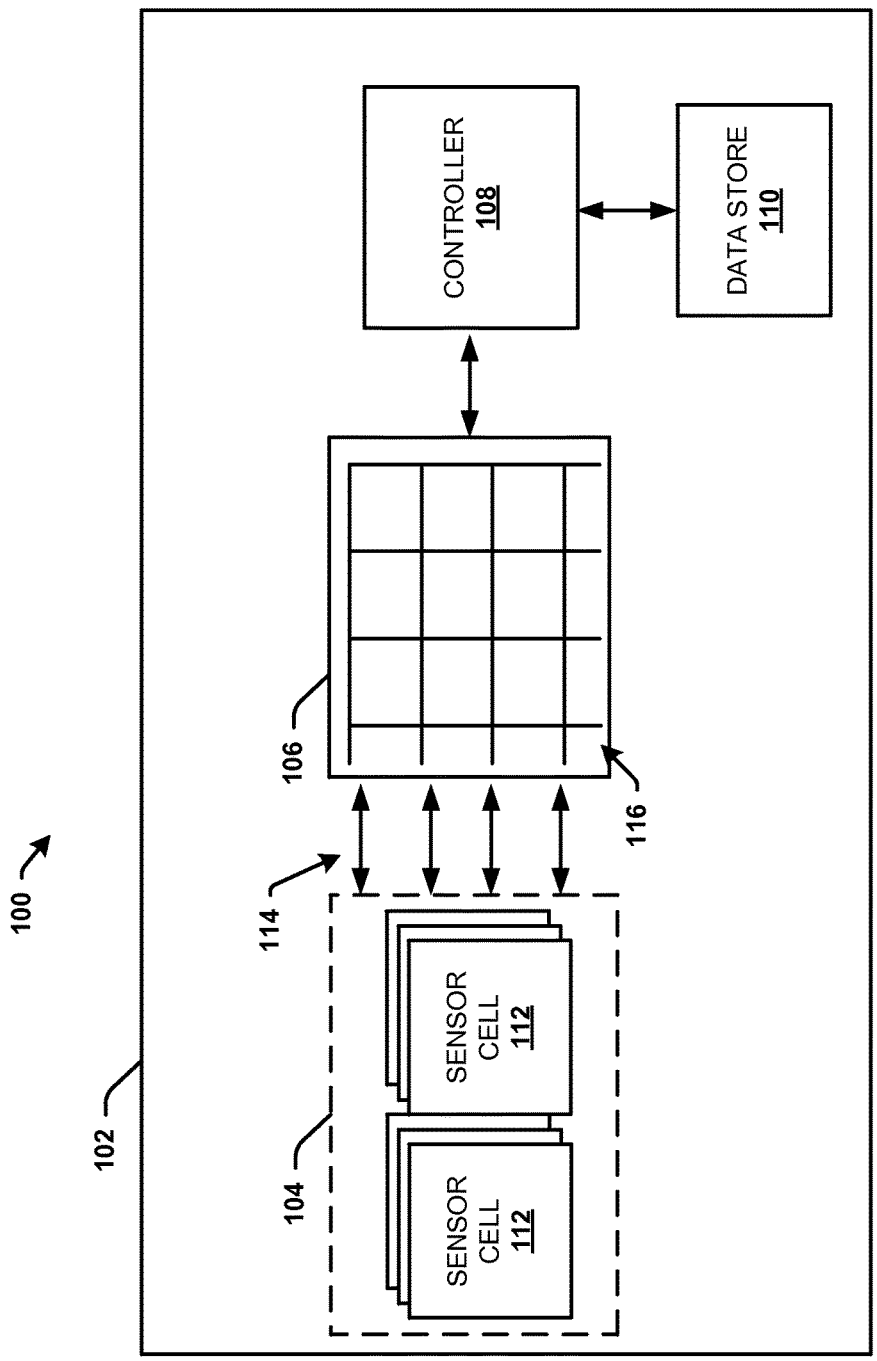
FIG. 1 is a block diagram illustrating a vehicular sensor system for utilizing a matrix switch and sensor matrix according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of sensor communications, various aspects are disclosed to a sensor system that increases flexibility among applications, provides options in sensor configurations, and extends functionality of sensor cell elements. A sensor can comprise one or more cells or elements that operate together in a sensor matrix for sensing or detecting a physical parameter. The cells can be configured as a sensor matrix comprising sensor columns and rows of switching elements, which are dynamically activated and controlled based on one or more criteria. For example, the criteria can include different categories of criteria related to the physical parameter, the sensor or the sensor cells (elements), a security level, a redundancy level, a desired functionality of the system, a mode of operation or other categories of criteria.

The sensor is integrated with a sensor matrix of sensor cells that is communicatively coupled to a matrix switch component on a same substrate that activates one or more communication routes. The communication routes are activated via switching elements arranged in a matrix configuration of columns, rows or layers to form a two dimensional or a three dimensional matrix, for example. The matrix communication routes of the matrix switch operate with a level of redundancy, at different consumption modes of operation, in different proprietary protocols, with different levels of accuracy or operate together in different numbers, based on determined predetermined criteria.

In one example, a sensor of a sensor system (e.g., a vehicular sensor system or other sensor communication system) can comprise a plurality of sensor cells arranged in a sensor matrix of sensor cell columns, sensor cell rows or sensor cell layers. The sensor cells are configured to generate sensor data related to a physical parameter. A matrix switch comprises a plurality of communication routes through a switching matrix of switching columns and switching rows coupled to the plurality of sensor cells. A control component is configured to selectively activate a communication route from among the plurality of communication routes through the switching matrix based on one or more detected criteria. Additional aspects and details of the disclosure are further described below with reference to figures.

FIG. 1 illustrates an example of a sensor system 100 that generates sensor data through selective communication routes of a matrix switch component in accord with various aspects described. The sensor system 100 can operate as a sensor system with one or more sub-systems for operation based on dynamically sensed data. The system 100 includes a communication device such as a wireless device, a mobile communication device or a sensor device 102 that is integrated on a single die such as a silicon substrate or other substrate material die. The system 100 comprises at least one controller 108 and a data store 110 for storing one or more criteria related to the sensor device 102, sensed data, or system operations. The criteria can include one or more predetermined criteria, as well as dynamically generated criteria detected on-the-fly.

The sensor system 100 comprises a sensor 104, which operates to sense or detect data related to one or more physical parameters via one or more sensor cells 112. The sensor 104 can operate to detect a magnetic field effect or other physical parameters (e.g., a pressure, an angle, an orientation, etc.). For example, the sensor 104 can comprise a tunneling magnetoresistance (TMR), a giant magnetoresistance (GMR) sensor, an extraordinary magnetoresistance (EMR) sensor, a colossal magnetoresistance (CMR) sensor, anisotropic magnetoresistance sensor (AMR), a similar transducer, or other type sensor. The sensor 104 operates to sense a magnetic field as well as field strength to measure current, position motion, direction or other physical parameters. The sensor 104 can include sensor cells or elements 112 from different classes of sensors or transducers (e.g., Hall elements, AMR elements, three dimensional sensor cell elements for detecting three dimensional fields/properties or the like) or be of a uniform type, in which the sensor elements are the same. For example, a portion of the sensor elements 112 can comprise a magnetic tunnel junction as each element. Other portions of sensors elements 112 can have different quality levels or bins of elements, or have different elements (e.g., Hall elements or other sensor elements) that comprise different properties such as sensitivity, linearity, operating ranges, or other properties, for example.

In one aspect of the sensor 104, the sensor cells or sensor elements 112 are arranged or communicatively coupled in a matrix configuration of sensor cell columns, rows, or layers for depth, which can be accessed or activated by one or more communication routes 116 of a matrix switch component 106. The sensor cells 112 of the sensor matrix are communicatively coupled via one or more sensor paths, signal routes or connections 114 to the matrix switch component 106, which operates to dynamically generate/activate channels or communication routes 116 to one or more of the sensor cells 112 of the sensor 104. The communication routes 116 are configured to activate, inactivate or facilitate communication of sensor data related to the physical parameter based on one or more criteria.

In one example, the matrix switch 106 can include a set of switching elements that operate to dynamically generate different signal routes, channels, or communications routes 116. The switching elements can be configured, activated, or modified in a matrix configuration along switching columns and rows of the matrix switch in order to dynamically activate and inactivate various communication routes 116 coupled between the sensor 104, or sensor cells 112, and one or more various inputs, outputs, ports (e.g., antenna ports, or other ports), applications or other components of the system coupled to columns, rows or layers of the matrix switch 106. Input ports and output ports, for example, can be coupled to the columns, rows or layers of the matrix switch 106 and to the sensor elements 112 as a function of the criteria.

The communication routes 116 can be generated as signal channels via switching elements of the matrix switch 106 for the communication of one or more antennas, transceivers, receivers, transmitters, terminations, communication components or other components or devices of the system 100, for example, according to a modification of predetermined criteria or a detection of one or more criteria. In response to detection or reception of a criterion, a controller component 108, for example, facilitates control of the generation of the communication routes 116, which can be differentiated from one another based on corresponding operations (vehicle sensing operations or system control processes) or the predetermine criteria. These operations or criteria, for example, can be dynamically detected by the sensor elements 112, other sensors, received from other systems or device components, or stored in one or more data stores 110.

Additionally, the one or more criteria can include an orientation parameter, a positioning, an intensity level, a direction or any combination thereof as related to the detected physical parameter (e.g., a magnetic field, an angle, or other parameter) or as related to the sensor 104 or one or more sensor cells 112 (e.g., three dimensional TMR cell, three dimensional Hall Cells or other such sensor cells). The one or more criteria can also include a level of redundancy of data, such as no redundancy or a redundancy that utilizes all sensor cells for communicating data related to the physical parameter. Alternatively or additionally, the redundancy level can include an intermediate level of redundancy to ensure accuracy of data and a fail-safe communication of data by checking at least one sensor cell data against the data of another sensor cell related to the same physical parameter. The one or more criteria can also include a mode of operation, such as a mode of power (e.g., a sleep mode, full power mode, a deactivated mode, a powering or ramp up mode of operation, or other power supply mode of operation). Other modes can also be envisioned such as a safety critical mode or a safety non-critical mode, in which sensor data with sensor cells having a higher quality of integrity over others with a lessor quality can be utilized based on the operation or component requesting the data. For example, an airbag system receiving pressure could utilize higher quality sensor cells in a first orientation, versus others with a lesser quality of a different orientation. Depending on a direction of the vehicle system, certain sensor cells of the sensor could be dynamically altered to sense objects over other sensor cells, for example. In this manner a dynamic and efficient use of sensor data can be provided to systems for control of a vehicle autonomously or other control system as the one or more criteria are continuously ascertained for the control of sensor cell communications.

Figure 2:
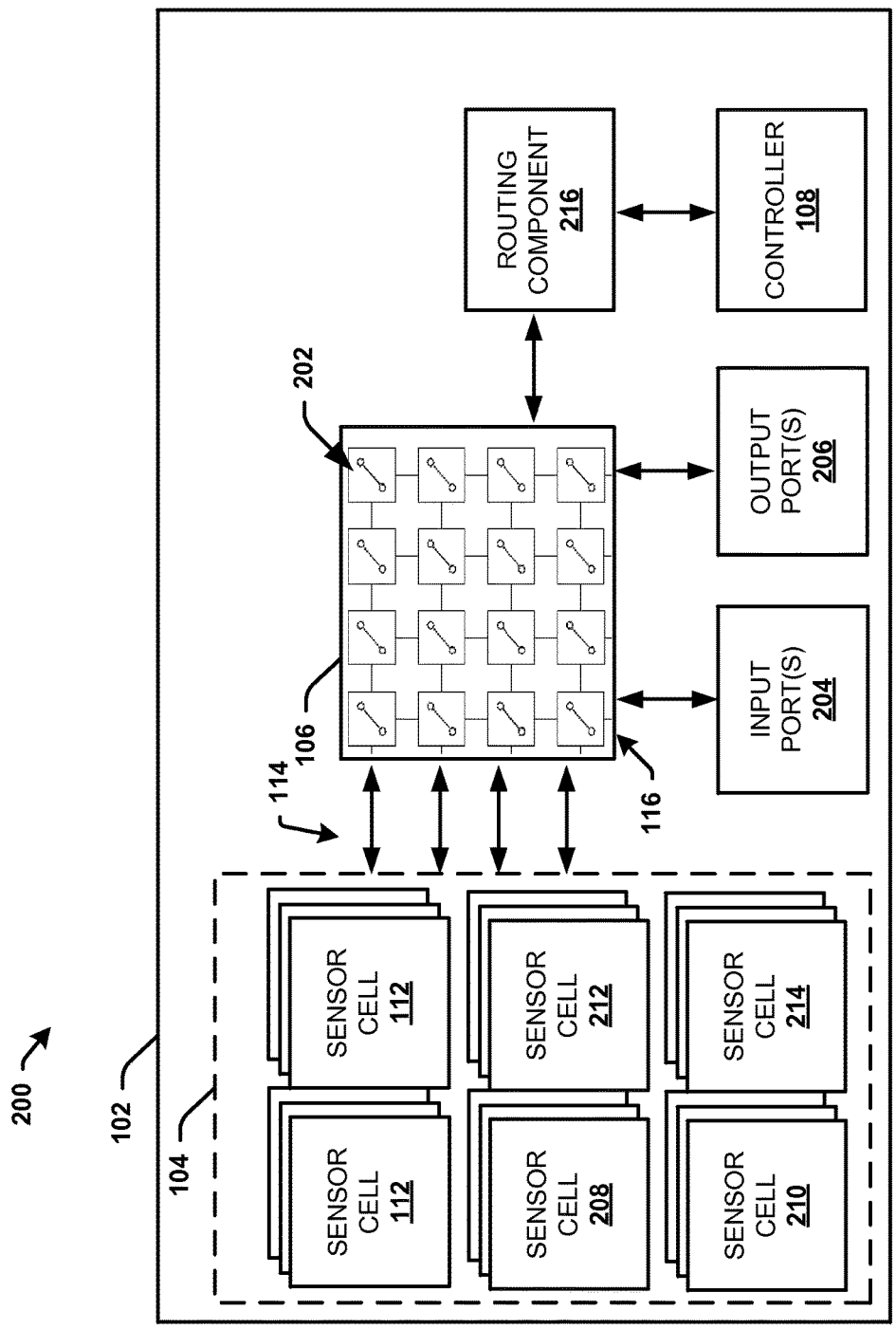
FIG. 2 is another block diagram illustrating a system for a matrix switch and a sensor matrix according to various aspects described.

Referring now to FIG. 2, illustrated is another example sensor system 200 that generates sensor data in a sensor cell matrix and communicates the data via a switching matrix in accordance with various aspects. The system 200 comprises similar components as discussed above, and further comprises switching elements 202, input port(s) 204, output port(s) 206, sensor cells 208-214, and routing component 216.

The matrix switch 106 comprises an array of switching elements 202 in a matrix configuration that can operate to route sensor communication inputs and outputs of M rows and N columns, wherein M and N comprise an integer that is equal to or greater than one, for example. The switching elements 202 can also represent matrix elements, in which more than one element of a matrix can connote a matrix size that is greater than one by one (1×1), for example. Alternatively, the matrix configuration can comprise a square matrix or other matrix configuration such as a rectangular matrix or the like, in which the M rows and N columns are not equal in number to provide a plurality of switches for switching routes, signal routes, communication routes or pathways among inputs and outputs. Alternatively or additionally, the matrix configuration can comprise a three dimensional aspect, in which the matrix configuration comprises M rows, N columns and O layers of depth. Likewise, the sensor cells 112, or 208-214 of the sensor 104 can also be arranged in a similar matrix configuration as the matrix switch 106 that includes M rows, N columns, or O layers of a sensor cells.

The matrix switch 106 is coupled to the controller component 108 and the routing component 216, which operates to control a selection of a signal route among a plurality of possible signal routes based on one or more predetermined criteria. The routing component 216 is configured to dynamically determine to which input terminal and output terminal of the switching columns and the switching rows that the communication route 116 connects through the matrix switch 106. The routing component 216 can determine which communication route 116 to activate via the switching elements 202 based on the component or device that is coupled to an input port 204 or an output port 206 and the predetermined criteria.

For example, pathways through switching columns and rows of the matrix switch 106 can be activated based on what components, devices, or systems are coupled to the input port(s) 204 as well as available resources or pathways for activation as part of the predetermined criteria. The routing component 216, for example, can operate based on different sensor cells, regions of cells, or partitions of sensor cells 112, 208-214 being associated with different regions of the matrix switch 106, in which each type, region or partition can be associated with a different device, a different level of redundancy, a different security level of operation, a different mode of operation of the device or component connected thereto, for example. The sensor cell(s) 208 can correspond with one or more potential (inactive or active) or actuated (active) communication routes 116 according to the one or more criteria. The sensor cells 208 can be associated with a different group of communication routes 116 than the sensor cells 112, for example, based on an identification of data related to the predetermined criteria. Alternative or additionally, the one or more corresponding communication routes 116 can be dynamically reassigned and configured to correspond with a different set of sensor cells based on a change in data related to the one or more criteria.

For example, during a full power mode of operation a first set of sensor cells 210 can be associated with one or more devices coupled to a first set of output ports 206, while another system or device, such as an engine control unit (ECU), an airbag control unit (ACU) or another control unit could be coupled to a second set of output ports for communicating or receiving sensor data. In response to a detection of a wake-up trigger or an even that triggers a sleep mode, the communication routes 116 associated with the sensor cells 210 could be deactivated and subsequently coupled to sensor cells 112, other sensor cells, or remaining to sensor cells 210 as well as additional sensor cells (e.g., sensor cells 214), for example. Other examples of the controller 108 or routing component 216 reconfiguring and dynamically altering the communication routes 116 through the matrix switch 106 can also be envisioned and no one example is limiting to the scope of this disclosure.

The routing component 216 can associate groups of potential communication paths 116 with one or more different sensor cells based on a priority, for example, based on other signal routing properties related to a state of the plurality of switching elements 202, or based one or more of the discussed predetermined criteria. As such, a dynamic operation of the sensor cells 112, 208-214 and the communication paths 116 can be generated as conditions, safety levels, redundancy levels, priority levels, modes of operation or device/component applications change with a changing system environment, such as with a sensor system of an an autonomous vehicle environmental detection system for the autonomous vehicle driving of passengers.

The sensor cells 112, 208-214 can also be configured to generate sensor data related to different physical parameters. Sensor cells 112 can detect a magnetic field or magnetic field distribution, while sensor cells 208 detect pressure changes and sensor cells 210-214 detect other physical parameters that are different from one another or the same.

The sensor cells 112, 208-214 can also be configured to generate sensor data to operate concurrently (at the same time or at about the same time) in a different number based on a level of redundancy as the one or more predetermined criteria. For example, a first input port 204 or a first output port 206 can be operationally coupled to a component that controls safety of a vehicle or other system, such as, for example, an airbag system, an alarm system (e.g., a vehicle back-up alarm or the other monitoring alarm), a braking system or other system or component. Therefore, the first input port 204 or the first output port 206 can be dynamically configured to be coupled to different numbers of communication paths 116 via corresponding switching elements 202. The switching elements 202 can control which paths can be activated or inactivated according to a safety/redundancy level that is received via the first input port 204 or first output port 206 or as a result of an assignment of a first set of switching elements 202 to a particular safety/redundancy level. For example, the first set of switching elements 202 can be assigned to a low safety level that communicates sensor data with a different level of redundancy, at different frequencies of communication or at different time periods (e.g., a time of day, a time of night, different durational clock cycles, or the like) than a second set of switching elements 202 within the matrix switch 106, which can be associated with a second different input port 204 or a second different output port 206 also. In addition, rows, columns or layers (e.g., layers of a three dimensional matrix switch) can also be assigned to different input ports 204 or output ports 206 in the same manner according to detected predetermined criteria.

In addition, the sensor cells 112, 208-214 can also be configured to generate sensor data to operate at different consumption modes of operation, operate in different proprietary protocols, operate with different levels of accuracy or operate together in different numbers, based on the one or more criteria being discussed in this disclosure. Some sensor cells, for example, can have different current consumption levels in comparison to one another, and thus be utilized according to a mode of operation (e.g., a sleep mode, an activation mode, an emergency mode, a powering mode, a driving mode, etc.) and according other detected data related to the predetermined criteria.

The input ports 204 can comprise connections via the matrix switch 106 to one or more receivers, antennas that can correspond to different bandwidths, different operating frequencies, or different networks of various network devices communicating with the sensor 104, an ECU, or other control unit of a system or a vehicle. The pathways or communication routes 116 vary according to the device or connections identified at the input ports 204 as well as a change in the one or more criteria discussed herein.

The output ports 206 can likewise comprise connections, for example, to one or more transmitters, receivers, transceivers, terminals, other devices, components or the like that correspond to different resource conditions of different bandwidths, different operating frequencies, different networks, network devices, for example, sub-systems or components. A port can comprise a connection or a connection interface, or comprise an address, a channel, separate communication/signal route terminal or other separate component that comprises a logical or a physical link for communication of different signals to one or more communication components of the system 200.

The controller component 108, for example, can be a digital signal processor, microcontroller, a transceiver processor, logic array, arithmetic logic array, or any other component that operates to receive one or more data and transform the data to operate the matrix switch 106 for configuring different signal routes between the input ports 204 or the output ports 206 and the sensor 104. The controller component 108 can operate to determine or store data identified by the sensor cells of the sensor 104 related to the one or more criteria and facilitate communications with the sensor 104 by generating different signals routes of the matrix switch 106 based on the various criteria.

The criteria determined, detected or received by the controller 108 can also operate as one or more variables, in which the controller 108 utilizes to identify/select an optimal route to activate via switching elements 202. The criteria operate as dynamic criteria or criteria variables that change depending upon the system environment in a given time frame. Further, the controller 108 can select signal routes through the matrix switch 106 and facilitate the matrix switch 106 to generate the selected routes as a dynamic function of one or more criteria or criteria variables, which themselves can contribute, not contribute or vary as part of (activated), or not part of (inactivated), the dynamic function based on the sensed criteria of the system 200 for selection of the signal routes in the matrix switch 106.

Criteria or the predetermined criteria, as used herein, can also be conditions. Although criteria can be considered conditions herein, conditions, as used in this context, can also be a reflection of a current state of resources (e.g., components, communication paths, or criteria) in time and within a detection range of the system 200. In addition or alternatively, the criteria can comprise a premise for operation such as with one or more communication parameters, for example, a frequency specific antenna, a certain bandwidth, a tuning circuit parameter or a tuning mechanism range, port specifications, related parameters, conditions/triggers for a mode of operation, a security protocol, a proprietary sensor communication or structure of a sensor cell, an application specific function or the other criteria for operation of the sensor cells 112, 208-214 of the sensor 104 with the matrix switch 106.

Figure 3:
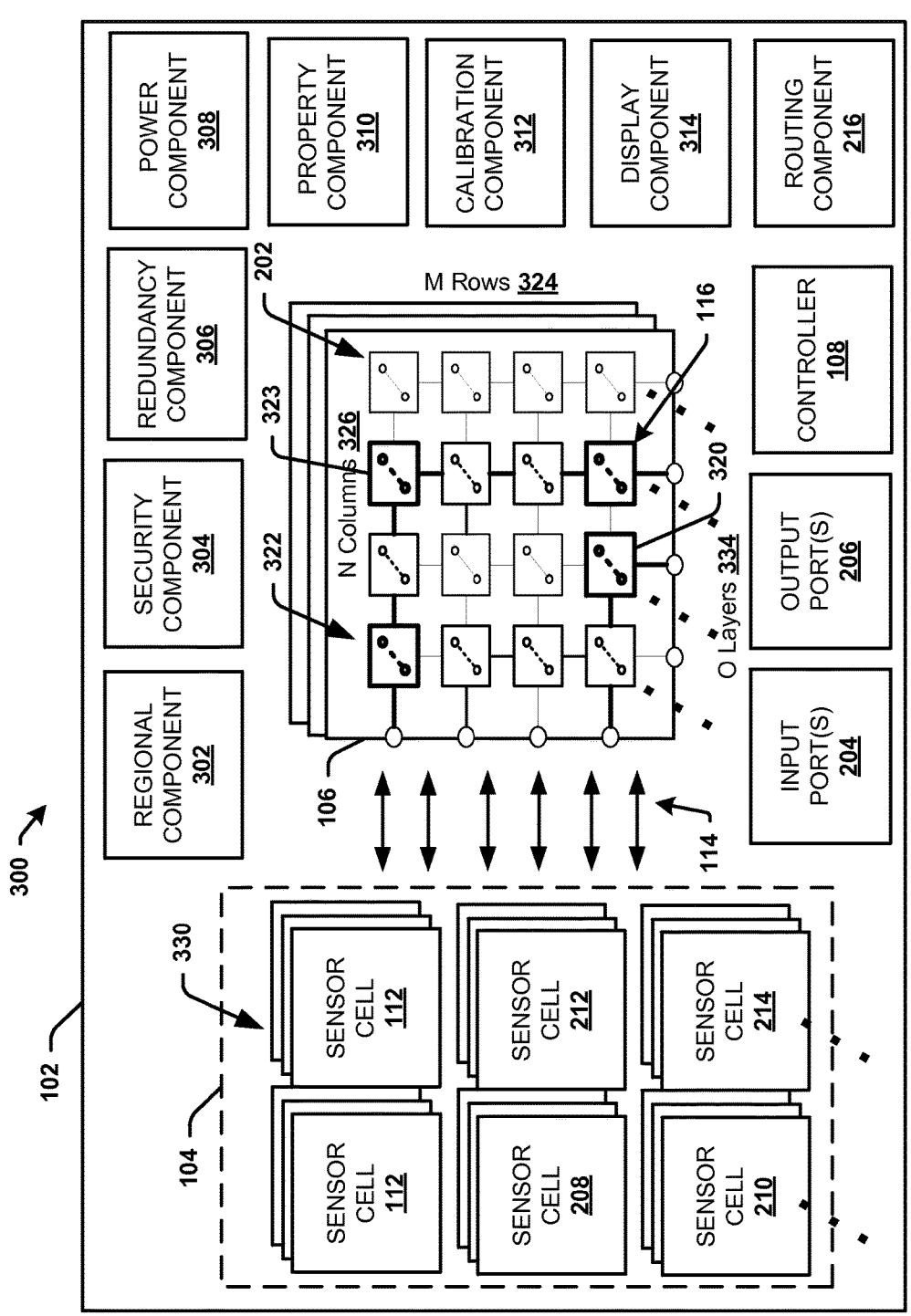
FIG. 3 is another block diagram of a device utilizing matrix switching for a sensor according to various aspects described.

Referring now to FIG. 3, illustrated is a sensor system 300 that generates sensor data in a sensor cell matrix and communicates the data via a switching matrix in accordance with various aspects. The system 300 comprises similar components as discussed above, and further comprises a regional component 302, a security component 304, a redundancy component 306, a power component 308, a property component 310, and a calibration component 312.

The controller 108 operates to generate signal paths, routes or channels via the matrix switching component 106 by controlling the switching elements or switches 202 that are selectively coupled to one another in a matrix configuration 322. The switches 202, for example, operate to activate, modify, block or enable a sensor communication route for transmission of data related to a sensed physical parameter along one or more routes or channels concurrently or simultaneously within the matrix switch 106. The sensor communication routes are selected and activated via the switching elements 202. The communication routes that are selected and activated by the controller 108 can comprise any number of the M rows 324, N columns 326 or O layers 334 of the matrix configuration 322. The routes can be operational or activated along any number of potential signal communication paths that are actuated via one or more switching elements 202. In other words, one or more M rows 324 can have operational switches of switching elements 202 that generate a first communication route based on a state or position of the switches within the actuated communication route, as well as one or more N columns 326 with operational switches of the switches 202 to facilitate generation of the same route path. Additionally, a second different communication route can be controlled or actuated by the controller 108 concurrent to the operation of the one or more different switches of the matrix switch 106. Alternatively or additionally, one or more communication routes or sensor cells of the sensor can be deactivated or blocked to prevent a communication of data from occurring in response to an outside or external security threat that satisfies a security threshold. For example, an inactivation of data could be used to prevent a further operation of one or more subsystems, such as an ignition system or other system component.

In another example, switches 202 activated from four rows and three columns could generate a first sensor communication route 323 (as bolded) via selection of one or more switching elements within the path of the communication route to any number of one or more sensor cells 112, 208-214, while switches 202 activated from one row and two columns can generate another second sensor communication route 320 (as bolded) to one or more other sensor cells 112, 208-214, in which one or more switches 202 could facilitate both of the sensor communication routes activated or only one channel or route at a time. In addition or alternatively, each sensor communication route can be generated with one switching element operating at an intersection of the rows and columns in the matrix configuration, such as at a row-column pair or of a row-column-layer pair (in a three dimensional matrix switch).

In addition, the sensor 104 can comprise a sensor matrix 330 comprised of the sensor cells 112, 208-214, for example, in which data related to each sensor cell can be stored, ascertained, or detected by the controller 108 or other components of the system 300 for use by one or more devices or components coupled to the input ports 204 or output ports 206 in order to receive or transmit data accordingly. The sensor matrix 330 can comprise a plurality of sensor cell rows, sensor cell columns or sensor cell layers, which are arranged in a two dimensional or a three dimensional sensor cell/element matrix configuration 330. The sensor cells 112, 208-214 as well as the switching elements 202 can formulate the matrix elements of the sensor matrix 330 dynamically coupled to the matrix configuration 322. Together, the matrices operate according to controller commands for activating or modifying various sensor cells and communication routes as a function of predetermined criteria.

The predetermined criteria or a set of the criteria can be determined (e.g., identified, detected, ascertained, obtained, sensed or the like) in a dynamic manner with respect to signaling data such as with RF communications or other communications. The predetermined criteria also can be received, stored, or ascertained from system environmental conditions (e.g., resources, electronic configurations, variables, parameters, application, etc.) present in or detected by the system 200 for the generation of communication routes through matrix switch 106 between various devices or other components and the sensor cells 112, 208-214. The system conditions can comprise communication parameters, resources available, or variables that characterize or quantitate communication functions in the system 200 as well as devices or other components coupled to the input ports 204 or output ports 206 of the matrix switch 106. The one or more criteria can therefore also comprise criteria data related to safety conditions, communication fail-safe conditions (e.g., data redundancy), one or more modes of operation as related to the devices or sub-systems coupled to inputs or outputs, security, proprietary configurations (e.g., sensor protocol of different manufacturers, architectures, sensor data formatting, or the like), other resource conditions, or any combination thereof.

The switching elements 202 can include one or more switches of the same or different types (e.g., single pole, single throw switches, double pole, single pole switches, any combination of other similar switches, etc.) that can be modified, selected, or activated, for example, to open or connect at least one connection point to another connection point, a sensor cell, groups of sensor cells to an input or output or a device coupled to the matrix switch 106. The configuration or activation of a communication route/channel or a set of sensor cells through the matrix switch and the sensor cell matrix 330 of sensor cells 112, 208-214 can be a function of one or more communication components that communicate or identify the one or more criteria for such activation or deactivation of sensor communications. The switching elements 202 of the matrix switch 106, for example, can be inactivated or modified to close out, cancel or alter a sensor communication route from one switching element to another switching element so that a sensor communication route from a neighboring switching element is no longer operational for a period of time via the one switching element or routed from the one switching element to the another switching element. This can occur, for example, when a security level has been met or a detection of a threat to a security level is identified.

The different criteria can also change according to what particular data related to the criteria are identified as factors within a set of criteria, in which communication routes can be generated as dynamically determined functions comprising different factors that further operate as variables for a quantization of one or more functions for selecting and configuring the sensor communication routes through the matrix switch 106. In response to a detection or a reception of a criterion, the controller 108 can operate to control the sensor communication routes that are generated through the matrix switch for utilizing various types of sensor cells integrated on a same die. The switching elements 202 can comprise one or more switches that can be an electromechanical device or other like switch that facilitates one or more communication contacts, such as signal path connections, electrical connections, relay connections, driving connections, or the like. Further, the switching elements 202 can operate to activate, open, direct, inhibit or generate propagation pathways as the sensor communication routes in one or more directions, one or more mediums, one or more frequencies or speeds with one or more patterns or forms of energy (e.g., phases, directions, magnitudes, light, electrical, mechanical, acoustic, etc.) depending upon the activated set of sensor cells.

The sensor 104 can further comprise a plurality of sensors, or have one or more different kinds of sensor cells 112, 208-214 that include proximity sensor cells, location detection sensor cells, orientation sensor cells, accelerometer cells, inclinometers cells, magnetic sensors, or the like. In one example, groups or pluralities of sensor cells can be configured in three dimensional matrix to detect and sense a three dimensional field (e.g., a three dimensional magnetic field or other distribution field) based on a position and a sensitivity level (e.g., an intensity level) of each sensor cell. For example, a working magnetic field distribution can be detected along a position of the sensor cells 112, 208-214, an intensity level or a field direction. The sensor cells 112, 208-214 can further identify a stray field or an interference to the working magnetic field. As such, a component can be coupled to the matrix switch 106 to illustrate in a display (e.g., a monitor, display screen or the like) changes of the three dimensional field for visual or systematic diagnostic. The fields can comprise object fields, such as magnetic fields, for example, that are sensed from one or more object, which can be one or more hands, or other object (e.g., a tree, large structure or device cover sensed or detected in location, proximity, presence, etc.) by one or more sensors or sensor cells 112, 208-214 coupled to or a part of the sensor device 102, such as for sensing heat, light, touch, location or the like sensed condition or other physical meaning with respect to the device 102, the matrix switch 106, the sensor matrix 330 or other component of the system 300. Other fields of other physical parameters can also be generated in a dimensional pattern according to which types of sensor cells 112, 208-214 are activated via activated communication routes through the matrix switch 106. For example, an orientation of the matrix switch 106 or the device 102, for example, can be determined or detected by the routing component 216 or by the one or more sensors 104 as an object field. The system 300 thus operates to monitor various parameters and fields of parameters based on dynamic connections that are selectively generated among sensor cells 112, 208-214 of the sensor 104 and through the matrix switching component 106.

Further, different sensor communication routes for different corresponding bandwidths, tunable elements/circuits, or different resources can comprise different modes of operation of the switches 202 or of the sensor matrix 330. The regional component 302, for example, can operate to select communication paths via the matrix switch 106 or sets of sensor cells 112, 208-214 based on data that correspond to a particular mode of operation (e.g., FDD, TDD, network connection, powering modes, security modes, communication modes, or the other modes). The controller 108 can be configured therefore to assess, ascertain or receive the different modes and the different zones or regions of sensor cells associated with various components, devices, or particular physical parameters (e.g., magnetic fields, heat fields, light fields and the like), along with associated specifications or specific functioning related to each. The regional component 302 can detect and associate switches according to regions or type of sensor cells 112 of the sensor matrix 330. The regional component 302 can dynamically determine which input terminal and output terminal of the switching columns and the switching rows to which the communication route connects through the matrix switch based on different sensor cells 112 associated with different regions within the matrix switch 106 and a set of signal routing properties related to one or more switching elements. The controller 108 can then operate to configure the switches based on the criteria discussed above, modes of operation, zone/region location and resource specification/parameters related to each zone, mode of operation or the inputs to the matrix to one or more devices, components or applications functioning thereat.

The regional component 302 can further dedicate parts or sides of the sensor matrix or regions of multiple sensor cells based on a sleep mode, a ramp-up or powering mode, a normal operational mode, and an exit mode, which can be associated with one or more levels of a current or a power consumption level. The regional component 302 can further dynamically alter the association to different modes with different regions or numbers of sensor cells depending on a request from the controller 108 and update the controller accordingly on the mode of operation and the particular sensor cells available at any given time.

The matrix configuration of the switching elements 202 as well as of the sensor cells 112, 208-214 can be extended in different ways. The switching elements 202 or the sensor cells 112, 208-214, for example, can comprise switches that propagate pathways or actuate routes in various different directions and dimensional spaces that can provide for light paths, acoustic pathways, electrical paths, signaling paths or other type routes for communication or detection of data related to the different physical parameters. In addition, the switching elements 202 can comprise switches that are not just configured in an M 324 by N 326 matrix as illustrated, but can span different arrays of space with different numbers of switching elements comprising additional rows, additional columns, or additional dimensions other than the illustrated two-dimensional space. For example, the matrix configuration of the switches can include the rows 324 and columns 326, and further comprise layers 334 so that the matrix can be configured in a three-dimensional matrix, for example, with M rows 324, N columns 326 and O layers 334, in which M, N and O can comprise an integer of at least one. The matrix switch 106 as illustrated can also represent multiple different matrix switches within the system 300, which can vary in size, type and dimension with respect to one another. Likewise, the sensor cells 112, 208-214 of the sensor matrix 330 can also be arranged in similar patterns as the switching matrices, in either the same number of elements or a different number of elements (sensor cells and switching elements) as one another.

The matrix switch 106 or the sensor matrix 330 can further comprise one or more components that are not limited to any one communication component or antenna, but can comprise a filter, an amplifier, monitor, diode, a termination for generation of a passive impedance, an active impedance, a forced perfect termination impedance or the like to create a parasitic effect or to mitigate a multipath propagation. The termination can be a match impedance or resistor component, which could operate to prevent signal reflection, such as with RF signals being reflected back through the switch route generated. The switch route can be temporary and reconfigured to direct path flow of signals or other transmissions dynamically or in real time such that as criteria changes, the variables change, as well as the type of criteria or criteria factors utilized in determining optimal sensor communication routes for communication flow throughout the system 300 overall.

The security component 304 is configured to detect a change in the physical parameter that is related to a safety threshold and communicate this change to the controller 108. For example, a safety threshold could be related to other systems of a vehicle or other system such as a locking system, an ignition system or the like. In response to an improper ignition sequence or set of inputs related to system 300, the security component 304 can determine/operate to block a communication route of the one or more communication routes from being activated. For example, an ignition system could be blocked in response to the sensor cells 112 detecting an improper magnetic field or other physical parameter by deactivating or preventing one or more of the switching elements from activating or deactivating one or more of the sensor cells 112 from being operational or activated. In another example, a security level can comprise a wake up function of an alarm in response to a steering wheel being moved or a detection from an outside security threat. The angular movement can be detected and communication to provide data to other operations, which in turn can activate or deactivate one or more sensor communication routes. Thus, the switching matrix and sensor matrix operate to provide various sensor communications based on various functions and modes as part of the one or more criteria, for example.

The security component 304 can further operate to allow switching on or off, or powering on or off of unclonable regions of the sensor matrix. The unclonable regions can involve proprietary sensor cells (from different manufacturers) that operate based on a security or proprietary protocol. For example, during diagnostic exams, in which certain sensors could not be manipulated due to proprietary constraints, these sensor cells can be powered on and off, as well as during other times/modes/functions of operation.

The redundancy component 306 is configured to determine a redundancy level of the sensor data. For example, in operations that demand fail-safe processes, such as an airbag control or automatic steering performance, then multiple sensor cells 208, 210-214 can be employed for communication data related to the physical parameter being monitored (e.g., a steering angle, a magnetic field, or the like) based on a redundancy or an overlap of communicated/sensed data.

In addition or alternatively, the sensor cells 112, 208-214 can have different levels of resolution or accuracy of signal detection to ensure a greater level of security or integrity in data being communicated. In other operations or sensing processes demanding a lesser fail-safe operation, a different amount of redundancy can be employed in communicating sensor data through various corresponding communication routes, in which a different number of communication routes or activated sensor cells are operational. In another example, a first mode of accuracy can provide data with a greater resolution or accuracy related to a sensed physical parameter than a second mode of accuracy, such as, for example, as related to an angle measurement or for a linear measurement.

Additionally or alternatively, the redundancy level can be determined as a function of the security level or a power level of the system. In idle mode, sensor communication can be limited to a lower number of activated sensor cells than in a full power mode, or a driving mode of operation, as well as have a different number of communication routes activated.

In another example, a greater number of sensor cells can be operational when a security mode is activated based on a time of night/day or another trigger, as such communication routes via the matrix switch 106 can be activated to more sensor cells 112 that sense different parameters or security related parameters, such as motion detection, heat or touch, for example. The redundancy component 306 thus determines a number of the plurality of sensor cells and corresponding communication routes to activate based on the redundancy level determined for a given operation of a vehicle or other system, in which different amounts of the same or similar data are communicated according to the redundancy level or other criteria as the one or more criteria.

In one aspect, the activated sensor cells 112, 208-214 of the sensor 104 can corresponding on a one to one ratio with the activated communication routes via the matrix switch 106. Alternatively or additionally, activated sensor cells and activated communication routes can correspond to a different ratio and be based on groups of sensor cells to a single activated communication route, for example.

The power component 308 is configured to determine a current consumption of the plurality of sensor cells and activate the plurality of sensor cells based on a mode of power consumption that relates to the sensor system 300. For example, a sleep mode, a ramp up or powering mode, a normal driving mode or an exit or powering down mode can be detected and utilized as triggers for activating sensor cells 112, 208-214 of the sensor 104 or communication routes 116 of the matrix switch 106. These modes can be identified as part of an operation sequence, communicated to the controller 108 and the other components in the sensor system 300, or detected by the controller 108 or the power component 308, for example. The power component 308 can operate to ensure power is provided to sensor cells for operation of a given number of sensor cells 112, 208-214 based on the detected criteria. In lower current consumption modes, communication routes 116 can be selected that have shielding material or shielding in order to not interfere with other communication routes without shielding for example, such as a magnetic shield or other type of shielding. In addition, the power component 308 can detect interference among communication routes of the matrix switch 106 and reconfigure or reactivate routes accordingly with a lesser level of interference.

The property component 310 is configured to identify a property associated with the physical parameter as part of the one or more predetermined criteria and activate a portion of the plurality of sensor cells based on the identified property, or based on a change in the identified property above or below a threshold. A two dimensional field or a three dimensional field related to the parameter can be sensed via the sensor cells 112, for example, in which interference or a disturbance to the detected parameter field can be communicated or depicted based on changes sensed along the sensor cell matrix 330 and the matrix switch 106. For example, a magnetic field distribution can be detected by a plurality of sensor cells, in which the position or orientation, intensity or direction of each sensor cell can detect a different aspect of the physical property such as an intensity or a direction along the sensed distribution field. The distribution field can be communicated and rendered in a three dimensional image in a display component 314, for example. In addition, the property component 310 can operate to determine different points for evaluation, in which a device, component or the system 300 utilized one, two, three or more points for evaluation of the data such as via spatial filtering or higher order evaluations (e.g., a long gradient or the other spectrum). The magnetic field distribution or other field can be a one dimensional point, a two dimensional or a three dimensional field that is evaluated by one or more sensor cells together, for example.

The property component 310 can further provide an indication of physical parameters that are being sensed as being outside of a safe area, a detectable area or a magnitude. For example, a mechanical, magnetic, stress, temperature, or other parameter that changes outside of a safe threshold could trigger a warning from the controller 108 to the display component 314 having a display view or an audio device, or other component via the matrix switch 106.

The calibration component 312 is configured to selectively calibrate at least one of the sensor cells via the communication route 116 of the matrix switch 106. Calibration setting can be communicated to the sensor 104 or cells 112, 208-214 based on data communicated through the matrix switch 106 to the sensor cells. For example, calibration can be done in the field or at manufacture, but can be continuously updated based on changes that can occur from process, voltage or temperature variations that occur over time.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
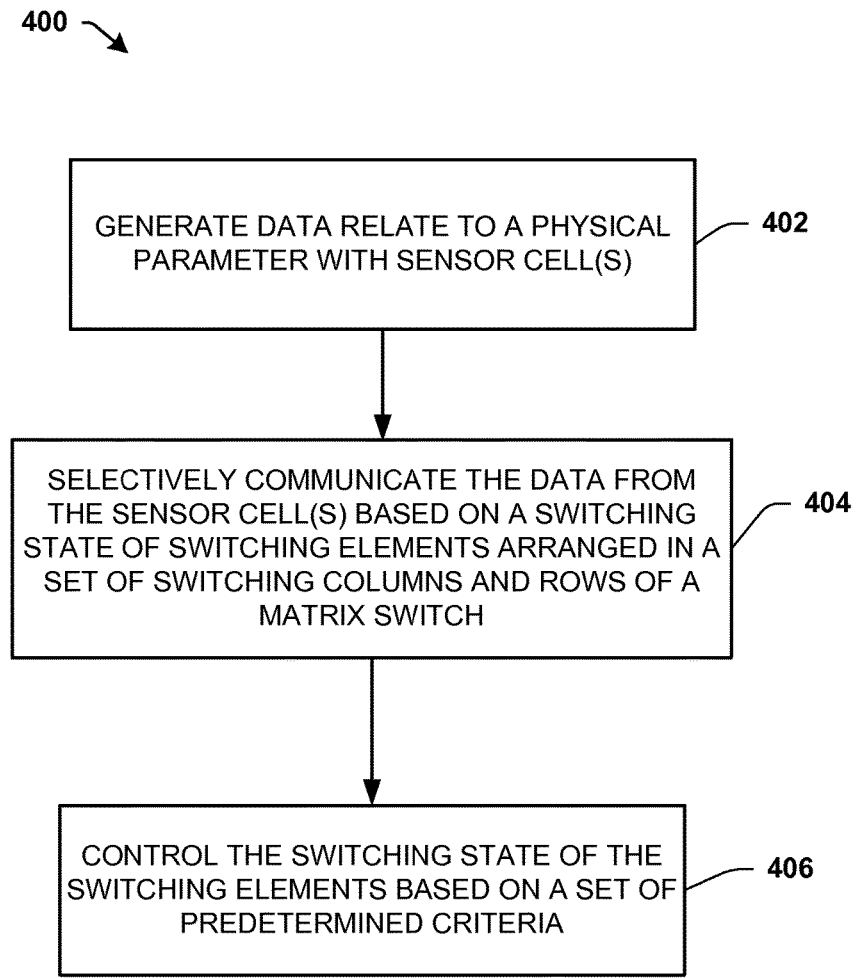
FIG. 4 is a flow diagram illustrating a method of sensor system according to various aspects described.

With reference to FIG. 4, illustrated is a method 400 for operating a matrix switch that generates one or more sensor communication routes for communications. The method 400 initiates at 402 by generating data related to a physical parameter (e.g., a magneto-resistive effect, a magnetic field, a pressure, an angle, a direction, a motion, etc.) from one or more sensor cells 112 of a sensor 104.

At 404, the method comprises selectively communicating the data from the sensor cells based on a switching state of switching elements 202 arranged in a set of switching columns and rows of a matrix switch 106.

At 406, the method comprises controlling the switching state or a position of the switching elements 202 based on a set of predetermined criteria. The controller 108 is configured to selectively activate a communication route through the matrix switch 106 and to sensor cells 112 by controlling the switching state of the switching elements 112, for example. The controller 108 detects the predetermined criteria by detecting a mode of operation of a sensor cell, a functionality of the sensor cell, a position or an orientation of the sensor cell, a property of the sensor cell or of the physical parameter monitored by the sensor cell. The controller 108 selectively generates a communication route 116 through the matrix switch 106 activating the switching elements 202 based on the set of predetermined criteria.

Figure 5:
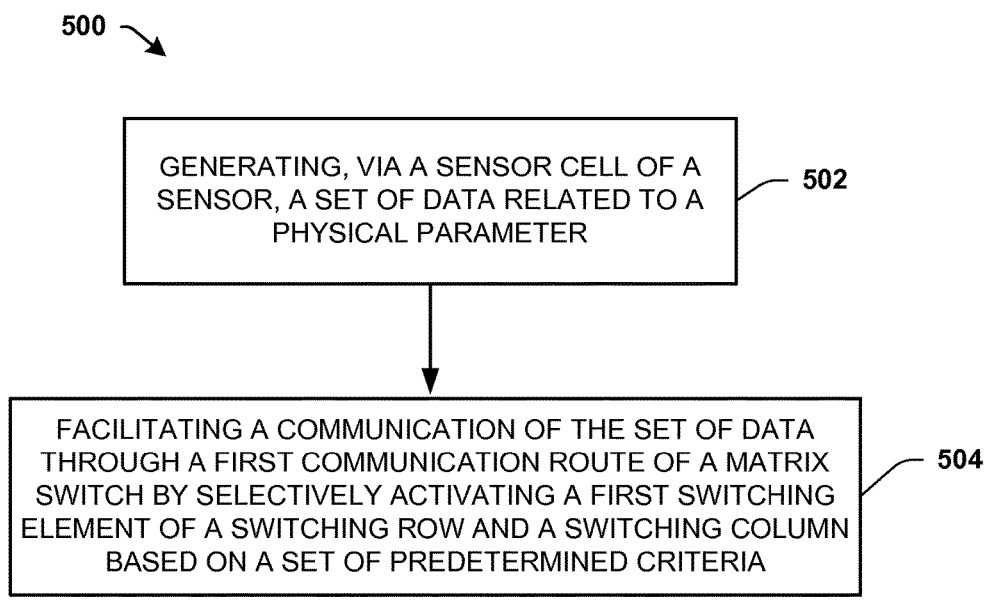
FIG. 5 is a flow diagram illustrating another method of a sensor system according to various aspects described.

Referring to FIG. 5, illustrated is a method 500 for a sensor system, such as a sensor system of a vehicle for monitoring a physical parameter with sensor cells selectively coupled to activated communication routes via a matrix switch integrated on a sensor die. The method 500 initiates at 502 with generating, via a sensor cell of a sensor, a set of data related to a physical parameter.

At 504, a communication of the set of data is facilitated through a first communication route of a matrix switch by selectively activating a first switching element of a switching row and a switching column of the matrix switch based on a set of predetermined criteria.

In addition, the method 500 can comprise determining at least one of redundancy level, a safety level, a security level, a functional level, a property of the physical parameter, a proprietary protocol associated with the sensor cell, or a mode of operation that includes a level of current consumption, as the set of predetermined criteria. A second communication route can be activated that is different from the first communication route by activating a second switching element of the matrix switch to communicate the set of data based on whether a predetermined threshold related to the set of predetermined criteria is satisfied.

In one aspect, a magnetic distribution of a magnetic field can be sensed by a plurality of sensor cells communicatively coupled to the matrix switch. The advantage of having multiple sensor cells over a spatial domain can further enable other fields to be generated, such as heat fields or the like. These fields in three dimensional overlays can be communicated to monitor a status of vehicular system or other system that is dependent upon different aspects of parameter fields or for different field property points for evaluation, such as via spatial filtering or higher order evaluations (e.g., a long gradient or the other spectrum).

The controller can also operate to select from among a plurality of sensor cells of a sensor matrix of the sensor to communicate the set of data via a first communication route and concurrently block a second sensor cell of the plurality of sensor cells or a second switching element from communicating a second data based on the detected set of predetermined criteria at a given time period.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A sensor system comprising:
a sensor comprising a plurality of sensor cells arranged in a sensor matrix of sensor cell columns and rows and configured to generate data related to a physical parameter;
a matrix switching component comprising a set of switching columns and switching rows coupled to the plurality of sensor cells and configured to generate a plurality of communication routes; and
a controller configured to selectively activate a communication route of the plurality of communication routes by activating a plurality of switching elements through the matrix switching component between an input/output port and a first set of sensor cells, and further configured to dynamically reassign the communication route comprising the plurality of activated switching elements to a second set of sensor cells having different sensors cells than the first set of sensor cells based on one or more criteria.

2. The sensor system of claim 1, wherein the controller is further configured to control a switching state of the plurality of switching elements of the matrix switching component to activate the communication route between the input/output port and the first set of sensor cells, and further configured to alter the communication route with different switching elements through the matrix switching component coupled between the input/output port and the first set of sensor cells based on a change in the one or more criteria.

3. The sensor system of claim 1, wherein at least one sensor cell of the plurality of sensor cells is configured to generated the data based on at least one of a position of the at least one sensor cell, an intensity of a magnetic field or a direction of the magnetic field.

4. The sensor system of claim 1, further comprising:
a routing component configured to dynamically determine which input terminal and output terminal of the set of switching columns and rows to which the communication route connects through the matrix switching component and alter an association of the communication route to a different device, a different level of redundancy, or a different security level.

5. The system of claim 1, wherein different sensor cells of the plurality of sensor cells are configured to generate different data related to different physical parameters, operate at different consumption modes of operation, operate in different proprietary protocols, or operate with different levels of accuracy, based on the one or more criteria.

6. The sensor system of claim 1, further comprising:
a security component configured to detect a change in the physical parameter that is outside of a safety threshold related to one or more systems of a vehicle and prevent the communication route of the plurality of communication routes from being activated to block operation of the one or more systems of the vehicle.

7. The sensor system of claim 1, further comprising:
a regional component configured to activate one or more regions of sensors cells of the sensor matrix based on the criteria;
a power component configured to determine a current consumption of the plurality of sensor cells and activate the plurality of sensor cells based on a mode of power consumption;
a redundancy component configured to determine a redundancy level of the data and determine a number of the plurality of sensor cells to activate based on the redundancy level;
a property component configured to identify a property associated with the physical parameter and activate a portion of the plurality of sensor cells based on the identified property; and
a calibration component configured to selectively calibrate at least one sensor cell of the plurality of sensor cells via the communication route of the matrix switching component.

8. A sensor device comprising:
a plurality of sensor cells configured to generate data related to a physical parameter;
a matrix switch comprising a plurality of switching elements arranged in a set of switching columns and rows, wherein the plurality of switching elements are configured to selectively communicate the data from the plurality of sensor cells based on a switching state of the plurality of switching elements; and
a controller configured to control the switching state of the plurality of switching elements by activating a first communication path between an input/output port and a first sensor cell by activating a first set of switching elements of the plurality of switching elements, and activating different switching elements of the plurality of switching elements than the first set of switching elements in a second communication path between the input/output port and the first sensor cell based on a change in a set of criteria.

9. The sensor device of claim 8, wherein the controller is further configured to selectively activate the communication route by activating the first set of switching elements through the matrix switch between the input/output port and the first sensor cell, and further configured to reassign the plurality of activated switching elements to a second set of sensor cells that is different than the first set of sensor cells through the matrix switch from the input/output port and the first sensor cell by controlling the switching state of the plurality of switching elements based on a change in the set of criteria.

10. The sensor device of claim 8, wherein the plurality of sensor cells are arranged in a sensor matrix comprising sensor cell columns and sensor cell rows that are selectively coupled to the set of switching columns and rows of the matrix switch in response to an activation of the plurality of switching elements and the plurality of sensor cells.

11. The sensor device of claim 8, wherein the controller is further configured to detect a change in the set of criteria comprising at least one of a mode of operation of a sensor cell, a functionality of the sensor cell, a position of the sensor cell, an orientation of the sensor cell, or a property of the sensor cell, and selectively a reconfigure the communication route through the matrix switch from the plurality of sensor cells by activating and deactivating the plurality of switching elements of the communication route based on the change in the set of criteria.

12. The sensor device of claim 11, wherein the controller is further configured to alter the communication route through the matrix switch between the input/output port and the first sensor cell by activating at least one different switching element of the plurality of switching elements based on a modification related to an application of the set of criteria to a vehicle environmental detection.

13. The sensor device of claim 8, wherein the plurality of sensor cells is further configured to detect a magnetic field distribution, and communicate, via the matrix switch, at least a portion of the magnetic field distribution based on an intensity level or a direction that is detected differently from an interference of a stray magnetic field among the plurality of sensor cells.

14. The sensor device of claim 8, wherein the plurality of sensor cells are configured to detect a change of an intensity level or a direction of a magnetic field and generate the data based on the change.

15. The sensor device of claim 8, wherein the controller is further configured to determine the set of criteria comprising a redundancy level, a safety level, a security level, a functional level, a property of the physical parameter, a proprietary protocol, or a mode of operation associated with the plurality of sensor cells, and select a communication route via the plurality of switching elements to communicate the data based on whether a predetermined threshold associated with the set of criteria is satisfied.

16. A method for a sensor comprising:
generating, via a sensor cell of the sensor, a set of data related to a physical parameter;
facilitating a communication of the set of data through a first communication route of a matrix switch by selectively activating a first plurality of switching elements of a switching row and a switching column of the matrix switch based on a set of criteria, wherein the first plurality of switching elements of the first communication route couple an input/output port and the sensor cell; and
dynamically reassigning the first communication route comprising the plurality of activated switching elements to a second set of sensor cells of the matrix switch having a different sensors cell than the first sensor cell.

17. The method of claim 16, further comprising:
determining at least one of redundancy level, a safety level, a security level, a functional level, a property of the physical parameter, a proprietary protocol associated with the sensor cell, or a mode of operation that includes a level of current consumption, as the set of criteria; and activating a second communication route through the matrix switch between the input/output port and the sensor cell that is different from the first communication route by activating a second plurality of switching elements of the matrix switch to communicate the set of data based on whether a predetermined threshold related to the set of criteria is satisfied.

18. The method of claim 16, further comprising:

generating a magnetic distribution of a magnetic field sensed by a plurality of sensor cells communicatively coupled to the matrix switch;

communicating the magnetic distribution to monitor a status of a working magnetic field based on the magnetic distribution; and detecting an interference from a stray magnetic field.

19. The method of claim 16, further comprising:

selecting, from among a plurality of sensor cells of a sensor matrix of the sensor, the sensor cell to communicate the set of data via the first communication route and concurrently blocking a second sensor cell of the plurality of sensor cells or a second switching element from communicating a second data based on the set of criteria.

20. The method of claim 16, further comprising:

detecting a security level threat from a communication to the matrix switch; and blocking the sensor cell or the switching element from communicating the set of data in response to the detected security level threat.

\* \* \* \* \*